United States Patent

Batawi

[11] Patent Number: 5,902,692
[45] Date of Patent: May 11, 1999

[54] BATTERY WITH PLANAR HIGH TEMPERATURE FUEL CELLS

[75] Inventor: Emad Batawi, Winterthur, Switzerland

[73] Assignee: Sulzer Hexis AG, Winterthur, Switzerland

[21] Appl. No.: 08/942,940

[22] Filed: Oct. 2, 1997

[30] Foreign Application Priority Data

Oct. 30, 1996 [EP]  European Pat. Off. .............. 96810723

[51] Int. Cl.⁶ ............................ H01M 8/10; H01M 8/24
[52] U.S. Cl. .................... 429/26; 429/32; 429/34
[58] Field of Search ................. 429/30–34, 38, 429/39, 12, 26

[56] References Cited

U.S. PATENT DOCUMENTS

| | | | |
|---|---|---|---|
| 3,300,344 | 1/1967 | Bray et al. | 429/33 |
| 3,394,032 | 7/1968 | Danner | 429/39 X |
| 3,432,357 | 3/1969 | Dankese | 429/34 |
| 4,476,197 | 10/1984 | Herceg | 429/32 |
| 5,145,753 | 9/1992 | Jrino et al. | 429/32 |
| 5,145,754 | 9/1992 | Misawa et al. | 429/32 |

FOREIGN PATENT DOCUMENTS

| | | |
|---|---|---|
| 0338823A1 | 10/1989 | European Pat. Off. . |
| 0410166A1 | 1/1991 | European Pat. Off. . |
| 0432381A1 | 6/1991 | European Pat. Off. . |
| 0446680A1 | 9/1991 | European Pat. Off. . |
| 0714147A1 | 5/1996 | European Pat. Off. . |
| 0722193A1 | 7/1996 | European Pat. Off. . |
| 4016157A1 | 12/1990 | Germany . |
| 4443688C1 | 3/1996 | Germany . |
| WO 92/16029 | 9/1992 | WIPO . |

OTHER PUBLICATIONS

Patent Abstracts of Japan, vol. 016, No. 267 (E–1217), Jun. 16, 1992 & JP 04062757A (NKK Corp), Feb. 27, 1992. Abstract.

*Primary Examiner*—Anthony Skapars
*Attorney, Agent, or Firm*—Townsend and Townsend and Crew LLP

[57] ABSTRACT

The battery with planar high temperature fuel cells comprises a stack-shaped, alternating arrangement of electrochemically active elements and interconnectors. The interconnectors are formed as air heat exchangers, each of which has a basic body. The thermal expansion of the interconnector is largely determined by the basic body. Each basic body separates an air side from a gas side. A structured layer is arranged on both sides of the basic body in each case: namely a structured layer for electrical conduction and heat transport as well as for a transport of air or combustion gas respectively along the electrochemically active elements. The thermal expansion of the basic body corresponds substantially to that of the electrochemically active elements. Each basic body is formed as an air heat exchanger and consists of a material on whose surface a permanent oxide layer forms under the operating conditions of the battery and in the presence of oxygen. On the air side of the basic body, the structured layer is bonded to the basic body in such a manner that the basic body is protected against oxide formation at the connection points.

14 Claims, 1 Drawing Sheet

Fig. 1
Fig. 2
Fig. 3
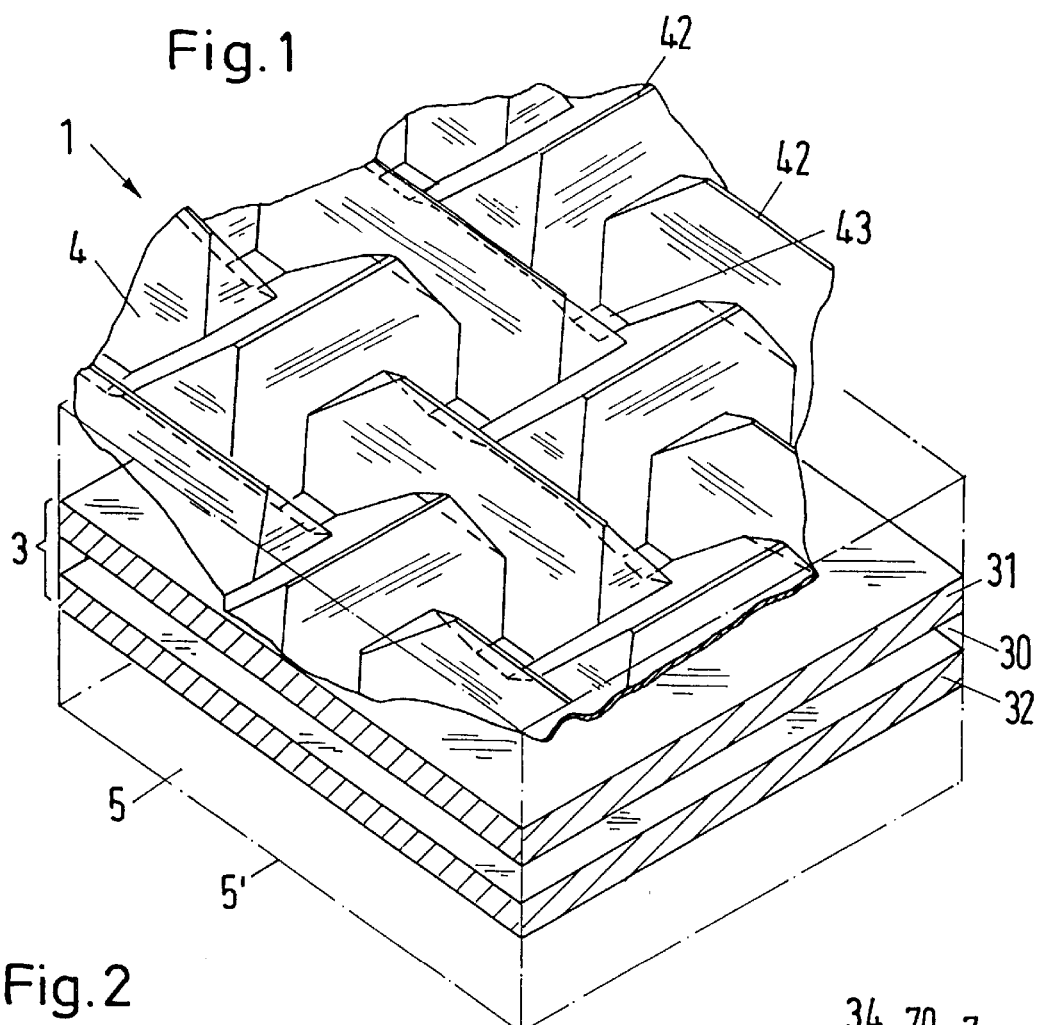
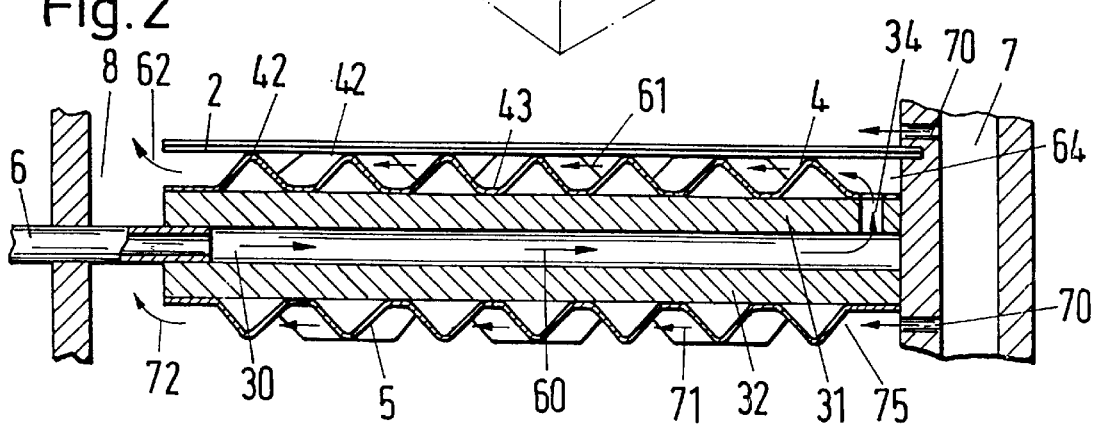
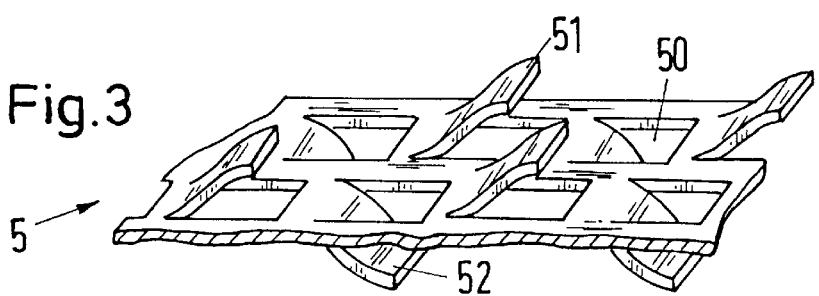

5,902,692

BATTERY WITH PLANAR HIGH TEMPERATURE FUEL CELLS

BACKGROUND OF THE INVENTION

1. Field of the Invention

The invention relates to a battery with planar high temperature fuel cells.

2. Description of the Prior Art

A battery of this kind is known from a European patent application with the number 9581039.5 (=P.6678)—designated EP-A xy in the following. The cells of the battery comprise, in each case, an electrochemically active plate and a three-layer interconnector formed as an air heat exchanger. The middle layer of the interconnector consists of a plate which has substantially the same coefficient of thermal expansion as the electrochemically active plate; the sideward layers are made of metal sheets which are substantially thinner than the plate of the middle layer. The metal sheets are structured in the manner of a relief and securely connected to the middle plate via a large number of contact points. The sideward metal sheets are formed for a direct contact with the electrochemically active plate and the corresponding plate of an adjacent cell.

Due to the high operating temperature and due to the formation of metallic oxides at the surface of the interconnectors, alloys must be used which consist of at least 25% chromium and which form a chromium oxide protective layer. The use of aluminides, which could also be used at elevated temperatures, is out of the question since aluminium oxide is electrically non-conductive, in contrast to chromium oxide. However, the occurrence of chromium oxide is combined with the disadvantage that this compound displays a certain volatility at the operating temperatures of the fuel cells and thus deposits on the electrodes of the electrochemically active plates, which leads to an ageing of these plates, namely an ageing in the form of a continually decreasing efficiency. This problem can be countered by means of suitable coatings: for this, see EP-A 0 714 147 (=P.6651).

SUMMARY OF THE INVENTION

The middle layer of the above named interconnector must be manufactured of an alloy which is relatively expensive. It is thus the object of the invention to provide a battery with planar high temperature fuel cells whose interconnectors can be manufactured of more economical materials.

The battery with planar high temperature fuel cells comprises a stack-like, alternating arrangement of electrochemically active plates and interconnectors. The interconnectors are formed as air heat exchangers, and each has a basic body. The thermal expansion of the interconnector is largely determined by the basic body. Each basic body separates an air side from a gas side. A structured layer is placed on both sides of the basic body in each case: namely a structured layer for electrical conduction and for heat transport as well as for a transport of air and/or combustion gas along the electrochemically active plates. The thermal expansion of the basic body corresponds substantially to that of the electrochemically active plates. Each basic body is formed as an air heat exchanger and consists of a material on whose surface a permanent oxide layer forms under the operating conditions of the battery and in the presence of oxygen. On the air side of the basic body, the structured layer is connected to the basic body in such a manner that the basic body is protected against oxide formation at the connection points.

Instead of electrochemically active plates, which represent cantilever elements, elements can also be used which are mounted in each case on the structured layer arranged at the gas side and are produced by means of a PVD or a VPS method. Production using the VPS (Vacuum-Plasma Spray) method is described in EP-A 0 653 896 (=P.6583). In this method the sprayed layer is applied, for example, to a substrate of metallic felt. Production using the PVD (Physical Vapour Deposition) method is described in EP-A 0 722 193 (=P.6658). An electrically conducting ceramic foam structure is advantageously used as a substrate in this method.

The materials which come into consideration for the basic body are those alloys resistant to high temperatures which contain aluminium and/or silicon.

Thanks to the formation of a protective layer of aluminium and/or silicon oxide, the basic body need not be coated. The structured layer on the air side of the interconnector must be produced from a thin, ductile metallic sheet. Examples for structured layers of this kind are described in EP-A xy. These consist of nickel-based alloys which contain chromium and which form volatile chromium oxides in an oxidizing environment; therefore a protective layer must be applied to the surface—for example of a ceramic, electrically conducting material, in particular manganites (La, Ca, Sr)$MnO_3$, chromite (La, Sr)$CrO_3$ or cobaltite (La, Sr)$CoO_3$. On the gas side a metal sheet like that on the air side can be used; here, however, no protective coating is necessary thanks to the reducing environment of the gas.

BRIEF DESCRIPTION OF THE DRAWINGS

FIG. 1 is a section of the interconnector of a fuel cell battery in accordance with the invention, FIG. 2 is a section through a fuel cell of a battery in accordance with the invention, and FIG. 3 is an example of a structured layer for the gas side of the interconnector.

DETAILED DESCRIPTION OF THE PREFERRED EXEMPLARY EMBODIMENTS

The interconnector 1 of FIG. 1 comprises a basic body 3, a structured layer 4 arranged on the air side and a structured layer 5 arranged on the gas side. The layer 5 is not shown in FIG. 1; merely its outer boundary surface 5' is shown in chain dotted lines. The two layers 4 and 5 can—cf. FIG. 2—be formed alike. On the air side of the basic body 3 the structured layer 4 is connected to the basic body 3 in such a manner that the latter is protected against oxide formation at the connection points 43.

The structured layer 4 of FIG. 1 consists of a thin metallic sheet which has a relief structure produced by deep drawing. The relief structure comprises knob-like structure elements 43 and comb-like structure elements 42. Each form a regular arrangement of projections on the two sides of a middle plane. Further examples for favorable relief structures are known from the above named EP-A xy.

The metal sheet 4 is fastened to the basic body 3 at the knob-like structure elements 43, preferably soldered on. The solder joints must be free from aluminium or silicon oxides and must remain so in order that the connections between the basic body 3 and the projections 43 are electrically conducting.

The basic body 3 with side walls 31, 32 and a cavity 30 is formed as a heat exchanger for the air fed into the fuel cells. The cavity 30 can be chambered and/or have a system of channels. In accordance with the invention, the basic body 3 consists of a material on whose surface a permanent oxide layer forms under the operating conditions of the battery and in the presence of oxygen.

The battery in accordance with the invention with planar fuel cells comprises a stack-shaped, alternating arrangement of interconnectors 1 and electrochemically active plates 2, so-called "PEN elements" (Positive Electrode/Solid Electrolyte/Negative Electrode). The sectional diagram of FIG. 2 shows a PEN element 2 with an interconnector 1 arranged below it whose structured layers 4 and 5 have the relief structure shown in FIG. 1.

The structured layers 4 and 5 permit, on the one hand, electrical conduction and heat transport mainly in the direction of the stack axis, and, on the other hand, a transport of air (arrow 61, reaction chamber 64) and fuel gas (arrow 71, reaction chamber 75) along the PEN elements 2.

The electrical conduction between the PEN elements 2 and the interconnectors 1 takes place at the contact points which are produced by the raised portions 42. The heat transport takes place through radiation and heat conduction. The air is fed into the cavity 30 of the basic body 3 via a plurality of tubelets 6. The combustion gas enters into the gas reaction chambers 75 of the fuel cells on the opposite side via a distributor 7 and bores 70. After flowing through the cavity 30 (arrow 60) and at the same time taking up heat, the air arrives into the air reaction chamber 64 of the fuel cell via apertures 34 on the side of the gas distributor 7. The air and the gas flow in the same direction to the surfaces of the PEN element 2 while driving the energy supplying processes and finally exit into a common channel 8 (arrows 62, 72). The gas mixture of the common channel 8 can be supplied to an afterburner; or an afterburning can take place in the channel 8 itself.

The thermal expansion of the interconnector 1 is largely determined by the basic body 3, and the thermal expansion of the basic body substantially corresponds to that of the electrochemically active plate 2, i.e. is substantially the same as that of the electrochemically active plate 2.

The structured layer 4 arranged at the air side must have an electrically conductive protective layer at the outer side which forms a barrier against the liberation of chromium oxide. A protective layer of this kind is not necessary for the layer 5 arranged at the gas side. This layer 5 can also have apertures. It can, for example, be structured in the shape of a grid or have a porous structure and in particular consist of a metallic felt or metallic felt parts. FIG. 3 shows a further example: a metal sheet with apertures 50 formed by punching and tongues 51 and 52 bent out at both sides, by means of which the contacts to the basic bodies 3 and to the PEN elements 2 respectively are produced.

The battery can have a substantially centrally symmetrical construction: a central axial distributor 7 for the combustion gas in the center of the stack, and air supply points 6 at the periphery of the basic body 3.

The battery can also essentially have the form of a parallelepiped: a distributor 7 for the combustion gas on the one side of the arrangement and air supply points 6 lying opposite to the gas distributor 7 which are arranged in such a manner that the air 60 flows in the direction opposite to the flow of the gas 71 in the basic bodies 3. A battery of this kind with a construction in the form of a parallelepiped is known, for example, from DE-A 44 31 510.

The material of the basic body 3 consists with advantage of a ferritic alloy which contains aluminium, chromium as well as iron, or silicon, chromium and also iron in accordance with one of the following compositions—specified in percentage by weight—:

a) 22% Cr/5–8% Al/remainder Fe,
b) 13–15% Cr/3.5–5%/Al remainder Fe,
c) 3–5% Si/3–5% Cr/remainder Fe, or
d) 2–4% Si/8–12% Cr/remainder Fe.

The thermal expansion of the material of the basic body 3 should differ by about $3 \cdot 10^{-6}$ $K^{-1}$ at most from that of the electrochemically active plate 2.

What is claimed is:

1. A battery with planar high temperature fuel cells, and comprising a stack-shaped, alternating arrangement of electrochemically active elements and interconnectors, the interconnectors being formed as air heat exchangers, each having a basic body and a thermal expansion, each basic body separating an air side from a gas side, a respective structured layer being arranged on each side of the basic body for electrical conduction and heat transport and for a transport of air and of combustion gas respectively along the electrochemically active elements, the thermal expansion of the interconnectors substantially corresponding to a thermal expansion of the electrochemically active elements, wherein each basic body is formed as an air heat exchanger and consists of a material on whose surface a permanent oxide layer forms due to operating conditions of the battery and in the presence of oxygen; and in that the structured layer is bonded to the basic body on the air side of the basic body in such a manner that the basic body is protected against oxide formation at connection points.

2. A battery in accordance with claim 1 wherein the material of the basic body is an alloy which is resistant to high temperatures and which contains aluminum and/or silicon; and in that the oxide layer consists of aluminum oxide or silicon oxide.

3. A battery in accordance with claim 1 wherein the structured layer arranged at the air side is soldered onto the basic body.

4. A battery in accordance with claim 1 wherein the structured layer arranged at the air side consists of thin metal sheets with a relief structure.

5. A battery in accordance with claim 4 wherein the relief structure comprises knob-like and/or comb-like structure elements, each of which forms a regular arrangement of projections on both sides of a central plane.

6. A battery in accordance with claim 4 wherein the structured layer arranged at the air side has an electrically conductive protective layer at an outer side which forms a barrier against the liberation of chromium oxide.

7. A battery in accordance with claim 1 wherein the structured layer arranged at the gas side is structured in the shape of a grid or has a porous structure.

8. A battery in accordance with claim 1 wherein each of the electrochemically active elements are attached to the structured layer arranged on the gas side and are manufactured by a PVD or a VPS process.

9. A battery in accordance with claim 1 wherein the stack-shaped arrangement has a substantially centrally symmetrical construction; and wherein a central axial distributor is provided for the combustion gas and air supply points are provided at a periphery of the basic body.

10. A battery in accordance with claim 1 wherein the stack-shaped arrangement has a construction which has a substantially parallelepiped construction; wherein a distributor is provided on the one side of the arrangement for the combustion gas; and wherein air supply points are arranged lying opposite to a gas distributor in such a manner that the air flows into the basic bodies in a direction opposite to the gas flow.

11. A battery in accordance with claim 1 wherein the material of the basic body is a ferritic alloy and contains aluminum, chromium and also iron, or silicon chromium and also iron in accordance with one of the following compositions—specified in percentage by weight—:

a) 22% Cr/5–8%/remainder Fe, b) 13–25% Cr/3.5–5% Al/remainder Fe, c) 3–5% Si/3–5% Cr/reminder Fe, or d) 2–4% Si/8–12% Cr/remainder Fe.

12. A battery in accordance with claim 1 wherein the coefficient of thermal expansion of the basic body material differs by at most about $3.10^{-6}$ $K^{-1}$ from that of the electrochemically active plate.

13. A battery in accordance with claim 4 wherein the structured layer arranged at the gas side consists of thin metal sheets with a relief structure.

14. A battery in accordance with claim 7 wherein the structured layer consists of one of either a metallic felt, metallic felt parts, or of an electrically conductive ceramic foam structure.

* * * * *